(12) United States Patent
Giacomini et al.

(10) Patent No.: US 9,739,524 B2
(45) Date of Patent: Aug. 22, 2017

(54) HORIZONTAL FLIPPER MULLION INCORPORATED WITHIN A FALSE MULLION OF AN APPLIANCE

(71) Applicant: WHIRLPOOL CORPORATION, Benton Harbor, MI (US)

(72) Inventors: Neomar Giacomini, St. Joseph, MI (US); Axel Julio Ramm, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/975,914

(22) Filed: Dec. 21, 2015

(65) Prior Publication Data

US 2017/0176094 A1    Jun. 22, 2017

(51) Int. Cl.
| | |
|---|---|
| A47B 96/04 | (2006.01) |
| F25D 23/06 | (2006.01) |
| F25D 23/04 | (2006.01) |
| F25D 23/08 | (2006.01) |
| F25D 25/02 | (2006.01) |

(52) U.S. Cl.
CPC ........... *F25D 23/069* (2013.01); *F25D 23/04* (2013.01); *F25D 23/087* (2013.01); *F25D 25/025* (2013.01); *F25D 2400/04* (2013.01)

(58) Field of Classification Search
CPC ...................................................... F25D 23/02
USPC ....................................... 312/402, 404, 405
See application file for complete search history.

(56) References Cited

U.S. PATENT DOCUMENTS

| | | | |
|---|---|---|---|
| 5,694,789 A | 12/1997 | Do | |
| 6,629,429 B1 * | 10/2003 | Kawamura | F25D 17/065 62/441 |
| 7,008,032 B2 | 3/2006 | Chekal et al. | |
| 8,172,346 B2 | 5/2012 | Tafoya et al. | |
| 8,764,133 B2 * | 7/2014 | Park | F25D 23/028 16/389 |
| 9,127,876 B2 | 9/2015 | Wilson et al. | |
| 2008/0209812 A1 | 9/2008 | Lancry et al. | |
| 2012/0073321 A1 | 3/2012 | Davis et al. | |
| 2014/0268648 A1 | 9/2014 | Gomes et al. | |
| 2014/0319989 A1 * | 10/2014 | Hwang | F25D 23/02 312/404 |

(Continued)

FOREIGN PATENT DOCUMENTS

| | | |
|---|---|---|
| KR | 20130026325 | 3/2013 |
| WO | 2014159355 | 10/2014 |

*Primary Examiner* — Matthew Ing
(74) *Attorney, Agent, or Firm* — Price Heneveld LLP

(57) ABSTRACT

An appliance includes a cabinet having outer walls that define a portion of a contact surface. Operable panels are engaged with the cabinet and operate between closed and open positions. A lateral mullion is pivotally attached to a mullion panel of the plurality of operable panels and is operable between contact and tucked positions. When the mullion panel is in the closed position, an outer surface of the lateral mullion is in the vertically pointed contact position and defines a portion of the contact surface to receive a seal of the mullion panel and selectively receive a seal of a vertically adjacent panel. Movement of the mullion panel to the open position rotates the lateral mullion about a horizontal axis to define the tucked position such that the mullion panel can move to the open position free of operation of the vertically adjacent panel.

20 Claims, 7 Drawing Sheets

(56) References Cited

U.S. PATENT DOCUMENTS

2015/0015133 A1 1/2015 Carbajal et al.
2015/0059399 A1* 3/2015 Hwang ................ F25D 25/025
 62/441

* cited by examiner

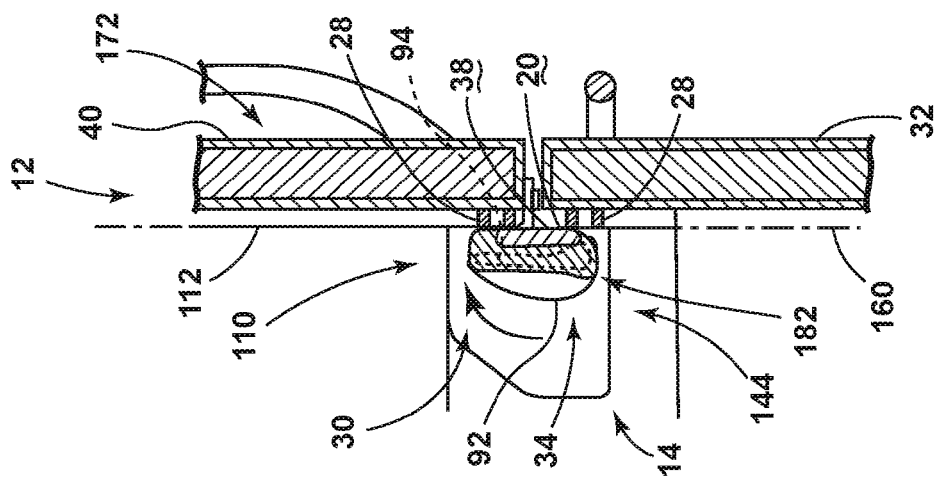
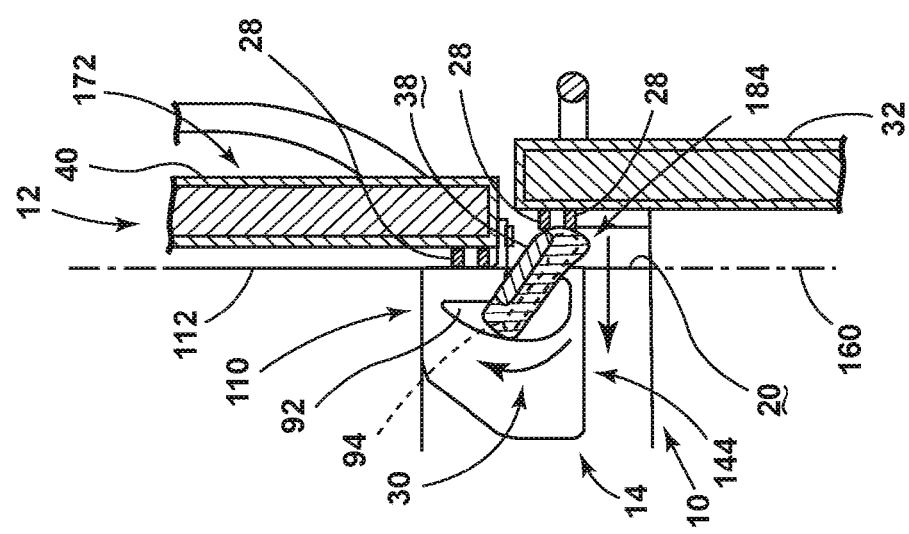
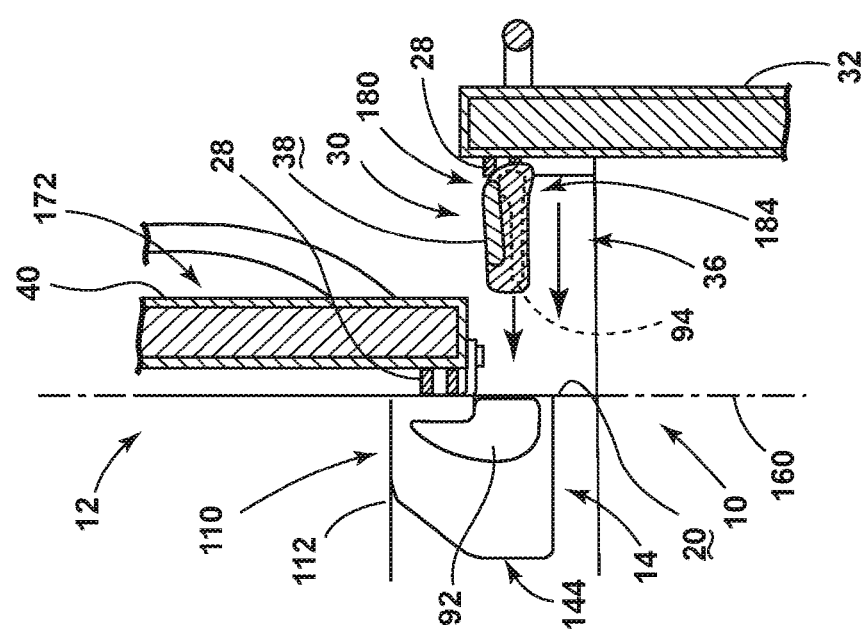

HORIZONTAL FLIPPER MULLION INCORPORATED WITHIN A FALSE MULLION OF AN APPLIANCE

BACKGROUND

The device is in the field of kitchen-type electrical appliances. More specifically, the device is in the field of operable false mullion structures for kitchen appliances.

SUMMARY

In at least one aspect, an appliance includes a cabinet having a plurality of outer walls that define a portion of a contact surface. A plurality of operable panels is operably engaged with the cabinet, wherein each operable panel is operable between closed and open positions. The closed position of each respective operable panel is defined by a seal of the respective operable panel being in direct contact with the contact surface. A lateral mullion is pivotally attached to a mullion panel of the plurality of operable panels and is pivotally operable between a contact position and a tucked position. The contact position is defined when the mullion panel is in the closed position such that an outer surface of the lateral mullion is in a vertical orientation and defines a portion of the contact surface to receive the seal of the mullion panel and selectively receive a seal of a vertically adjacent panel. Movement of the mullion panel to the open position rotates the lateral mullion about a horizontal axis to define the tucked position such that the mullion panel can move to the open position free of operation of the vertically adjacent panel.

In at least another aspect, a mullion assembly of an appliance includes a lateral mullion operable about a horizontal axis between a contact position and a tucked position, wherein the contact position places an outer surface of the lateral mullion in a vertical orientation to define a portion of a contact surface of the appliance, and wherein the contact surface is substantially positioned in a single vertical plane. At least one mullion guide is attached to a cabinet of the appliance that is positioned such that the at least one mullion guide receives an end of the lateral mullion in the contact position to define the contact surface. A mullion panel is operable between open and closed positions relative to the contact surface. The lateral mullion is pivotally coupled to the mullion panel such that operation of the mullion panel to the closed position defines an engagement between the lateral mullion and the at least one mullion guide to operate the lateral mullion from the tucked position to the contact positions. Operation of the mullion panel away from the closed position causes the at least one mullion guide to operate the lateral mullion from the contact position to the tucked position. A vertically adjacent panel is operable between a panel open position and a panel closed position, wherein when the vertically adjacent panel is in the panel closed position, the vertically adjacent panel engages the portion of the contact surface defined by the lateral mullion in the contact position.

In at least another aspect, an appliance includes a cabinet having a plurality of walls that define a portion of a contact surface, wherein the contact surface includes a selectively operable lateral portion that operates between a flush position and a displaced position. A lateral mullion selectively defines the selectively operable lateral portion of the contact surface, wherein the lateral mullion is selectively operable between a contact position that corresponds to the flush position, wherein the selectively operable lateral portion is flush with a remainder of the contact surface, and a tucked position that corresponds to the displaced position wherein the selectively operable lateral portion is free of alignment with the remainder of the contact surface. A mullion panel is operable between open and closed positions. The lateral mullion is pivotally connected proximate a laterally extending edge of the mullion panel, wherein the open position of the mullion panel corresponds to the displaced position of the selectively operable lateral portion and the closed position of the mullion panel corresponds to the flush position of the selectively operable lateral portion. A vertically adjacent panel is operable between a panel open position and a panel closed position, wherein the vertically adjacent panel in the panel closed position engages the selectively operable lateral portion in the flush position, and wherein the selectively operable lateral portion is operable between the flush and displaced positions when the vertically adjacent panel is in any of the panel open and panel closed positions.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 9 is a cross-sectional view of a refrigerating appliance illustrating operation of the lateral mullion and mullion panel with respect to the vertically adjacent panel, with the lateral mullion in the tucked position;

FIG. 10 is a cross-sectional view of the appliance of FIG. 9 illustrating movement of the lateral mullion toward the contact position as the mullion panel is moved toward the closed position;

FIG. 11 is a cross-sectional view of the appliance of FIG. 10 illustrating the lateral mullion in the contact position and the mullion panel in the closed position;

DETAILED DESCRIPTION OF EMBODIMENTS

Figure 1:
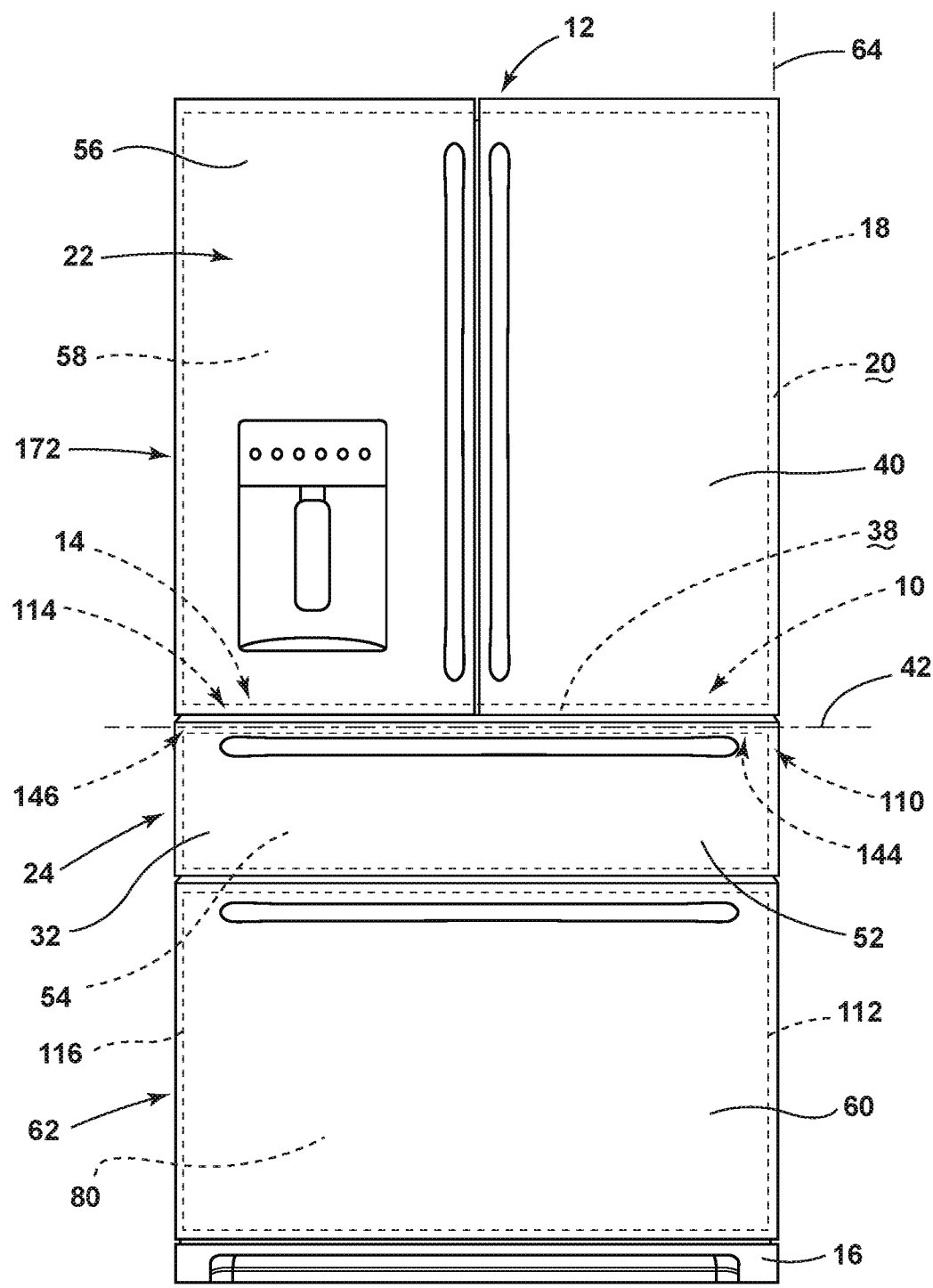
FIG. 1 is a front elevational view of an appliance incorporating an aspect of the operable lateral mullion.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-11, reference numeral 10 generally refers to a mullion assembly incorporated within an appliance 12, where the mullion assembly 10 typically defines at least a portion of a false mullion 14 for the appliance 12. According to the various embodiments, the appliance 12 can include a cabinet 16 having a plurality of outer walls 18 that define a portion of a contact surface 20. A plurality of operable panels 22 of the appliance 12 are operably engaged with the cabinet 16 proximate the contact surface 20. Each operable panel 22 is adapted to be operable between closed and open positions 24, 26. The closed position 24 of each respective operable panel 22 is defined by a seal 28 of the respective operable panel 22 being in direct contact with the contact surface 20. The open position 26 of each respective operable panel 22 is defined by the seal 28 for the respective operable panel 22 being removed from a portion of the contact surface 20 proximate the outer walls 18 of the cabinet 16. An operable lateral mullion 30 is pivotally attached to a mullion panel 32 of the plurality of operable panels 22. The lateral mullion 30 is pivotally operable between a contact position 34 and a tucked position 36.

Referring again to aspects of the device as exemplified in FIGS. 1-11, the contact position 34 of the lateral mullion 30 is defined when the mullion panel 32 is in the closed position 24 such that an outer surface of the lateral mullion 30 is in a vertical orientation and also defines a portion of the contact surface 20. In this manner, the outer surface of the lateral mullion 30 is adapted to receive the seal 28 of the mullion panel 32 and also selectively receive a seal 28 of a vertically adjacent panel 40. It is contemplated that movement of the mullion panel 32 to the open position 26 serves to rotate the lateral mullion 30 about a horizontal axis 42 to define a tucked position 36 of the lateral mullion 30. In this manner, the mullion panel 32 can be moved to the open position 26 free of operation of the vertically adjacent panel 40. Accordingly, when the mullion panel 32 is moved from the closed position 24 to the open position 26, the lateral mullion 30 is operated from the vertically oriented contact position 34 to the generally horizontally oriented tucked position 36, such that the lateral mullion 30 is tucked at least partially behind the mullion panel 32 to bypass the vertically adjacent panel 40, such that the mullion panel 32 can be operated without substantially disturbing the vertically adjacent panel 40, when in the closed position 24. Similarly, when the vertically adjacent panel 40 is in the closed position 24 and the mullion panel 32 is moved toward the closed position 24, the lateral mullion 30, being in the tucked position 36 and disposed at least partially behind the mullion panel 32, passes by the vertically adjacent panel 40 and rotates about the horizontal axis 42 to be vertically oriented and behind the vertically adjacent panel 40 as the mullion panel 32 is moved into the closed position 24. In this manner, as the mullion panel 32 moves into the closed position 24, the operable lateral mullion 30 is rotated from the horizontal tucked position 36 and into the vertically oriented tucked position 36 to define at least a portion of the contact surface 20 of the cabinet 16. Accordingly, the mullion panel 32 can be moved into the closed position 24, such that the lateral mullion 30 can be placed in contact with the respective seals 28 of the mullion panel 32 and the vertically adjacent panel 40 by moving only the mullion panel 32.

Referring again to FIGS. 1-11, it is contemplated that the operable lateral mullion 30 can be positioned proximate the top edge 50 of the mullion panel 32. Accordingly, as exemplified in FIGS. 1-11, the lateral mullion 30 is positioned at a top edge 50 of the pantry drawer 52 for the pantry compartment 54 of the appliance 12. In such an embodiment, the hinged door panel or panels 56 of the refrigerated compartment 58, depending upon the design of the appliance 12, can correspond to the vertically adjacent panels 40 that engage the outer surface 38 of the lateral mullion 30 when in the contact position 34. As such, the mullion panel 32 can be defined by a drawer panel 60 of a slidable drawer 62 that is laterally slidable between the open and closed positions 26, 24 and the vertically adjacent panel 40 is a hinged door or a plurality of hinged door panels 56 that each rotate about a respective vertical axis 64.

Referring again to FIGS. 1-11, it is also contemplated that the lateral mullion 30 can engage to a bottom edge 70 of the mullion panel 32, where the mullion panel 32 can correspond to an operable hinged door panel 56 that is operable about a vertical axis 64. In such an embodiment, the operable lateral mullion 30 can be disposed at the bottom edge 70 of the single operable hinged door panel 56, or may be defined by separate sections 72 of the lateral mullion 30 that are disposed at a bottom edge 70 of each of a pair of operable French door panels 56 that rotate about respective vertical axes 64. It is contemplated that where the operable lateral mullion 30 is disposed at a bottom edge 70 of a door panel 56, the operable lateral mullion 30 moves with the door between the open and closed positions 26, 24. The lateral mullion 30 then rotates downward about a horizontal axis 42 when the door panels 56 are moved into the closed position 24. In this manner, when the operable lateral mullion 30 is moved such that the door panel 56 is proximate into the closed position 24, the outer surface 38 of the lateral mullion 30 can operate between the tucked position 36 and the contact position 34 as the various operable door panels 56 are moved into the closed position 24. The vertically adjacent panel 40, in this configuration, may be positioned below the mullion panel 32, where the vertically adjacent panel 40 can be defined by a drawer panel 60 or door panel 56 that operates below the lateral mullion 30.

According to the various embodiments, the use of the operable lateral mullion 30 can at least partially define the false mullion 14 for the appliance 12, where the false mullion 14 defines at least a portion of the contact surface 20 of the appliance 12. The false mullion 14 is configured to define the contact surface 20 but may not extend to define a separation between interior compartments 80 of the appliance 12. Accordingly, the false mullion 14 is positioned proximate the contact surface 20 and separate interior panels 82 or interior storage areas 84 may be attached to the false mullion 14 to at least partially define a separation between interior compartments 80 of the appliance 12. By way of example, and not limitation, the false mullion 14 may serve to define the contact surface 20 that extends between the pantry drawer 52 of the pantry compartment 54 and the door panels 56 of the refrigerated compartment 58. The separation between the refrigerated compartment 58 and the pantry compartment 54 may be defined by interior panels 82 that are positioned adjacent to or attached to the false mullion 14, but are separate from the false mullion 14. Accordingly, the false mullion 14 serves to define a selectively removable portion of the contact surface 20 for defining a seal 28 between the various operable panels 22 that are disposed adjacent to the false mullion 14 as will be described more fully below.

Referring again to FIGS. 1-11, it is contemplated that the false mullion 14 can be further defined by at least one mullion guide 90 that also defines at least a portion of the contact surface 20 for the cabinet 16. In such an embodiment, the at least one mullion guide 90 is positioned to engage the lateral mullion 30 when the lateral mullion 30 is in the contact position 34. The lateral mullion 30 and the mullion guide 90 cooperate to define the false mullion 14 that extends between vertically positioned outer walls 18 of the cabinet 16 when the lateral mullion 30 is in the contact position 34. The at least one mullion guide 90 can further serve to operate the lateral mullion 30 between the tucked position 36 and the contact position 34 as the mullion panel 32 is moved into and away from the closed position 24. Accordingly, the mullion guide 90 can include a guide groove 92 that engages a guide flange 94 positioned at an end 96 of the lateral mullion 30. Movement of the mullion panel 32 proximate the closed position 24 (i.e., into or away from the closed position 24) serves to engage the guide flange 94 of the lateral mullion 30 with the guide groove 92 of the mullion guide 90 to operate the lateral mullion 30 between the contact and tucked positions 34, 36. It is contemplated that the position of the guide groove 92 and the guide flange 94 can be switched such that the guide groove 92 is disposed at an end 96 of the lateral mullion 30 and the guide flange 94 is disposed within a portion of the mullion guide 90.

Referring again to FIGS. 2-11, it is contemplated that a first mullion guide 110 can be positioned at a first sidewall 112 of the cabinet 16 and a second mullion guide 114 can be positioned at a second sidewall 116 of the cabinet 16 opposite the first mullion guide 110. Where the lateral mullion 30 is engaged to a mullion panel 32 which extends substantially across the entire cabinet 16, the lateral mullion 30 can include guide flanges 94 at each end 96 of the lateral mullion 30 such that the mullion guide 90 engages both the first and second mullion guides 110, 114 to operate the lateral mullion 30 in between the contact and tucked positions 34, 36.

According to various alternate embodiments, as exemplified in FIGS. 1-13, where the mullion panels 32 extend only part way across the appliance 12, such as where the mullion panel 32 is only one of a pair of French doors for the appliance 12, each of the operable French doors includes a separate section 72 of the operable lateral mullion 30, each section 72 of the operable lateral mullion 30 of the French doors may engage only one of the first and second mullion guides 110, 114. In such an embodiment, the opposing ends 96 of each of the sections 72 of the lateral mullion 30 engage one another such that when each of the operable French doors are in a closed position 24, each section 72 of the lateral mullion 30 and the first and second mullion guides 110, 114 define the false mullion 14 for the appliance 12 as well as a portion of the contact surface 20 for the cabinet 16. Such configuration also allows each individual operable door of the pair of French doors to be operated between closed and open positions 24, 26 and, in turn, operate the respective section 72 of the lateral mullion 30 between the tucked and contact positions 36, 34 independently without disturbing the other of the opposing French doors or the vertically adjacent panel 40, as described above.

Referring again to FIGS. 1-13, it is also contemplated that a pantry compartment 54 may include two separate pantry drawers 52, where each pantry drawer 52 includes a separate section 72 of the lateral mullion 30 that are independently operable from one another between the tucked and contact positions 36, 34. As discussed above, where multiple pantry drawers 52 are included, a section 72 of the operable lateral mullion 30 corresponding to one of the pantry drawers 52 may engage only one of the first and second mullion guides 110, 114 to operate a section 72 of the lateral mullion 30 between the tucked and contact positions 36, 34. Additionally, the sections 72 of the lateral mullion 30 can engage one another at a mullion seal 130 that provides a thermal seal 28 between the sections 72 of the lateral mullion 30.

According to the various embodiments, as exemplified in FIGS. 1-13, the engagement between the operable lateral mullion 30 and one or both of the first and second mullion guides 110, 114 can include a sealed arrangement such that when the lateral mullion 30 is engaged with one or both of the mullion guide 90, the engagement of the guide groove 92 and guide flange 94 serves to substantially seal the engagement to prevent unnecessary thermal dissipation and loss of heat from the various interior compartments 80 of the appliance 12. Additionally, where the lateral mullion 30 is split into sections 72 where the lateral mullion 30 is attached to multiple pantry drawers 52 or multiple operable door panels 56, the engagement between the sections 72 of the lateral mullion 30 can define a similar guide groove/guide flange arrangement that defines a thermal seal 28 between sections 72 of the lateral mullion 30 to prevent unnecessary thermal discharge and unnecessary loss of heat through the contact surface 20 of the false mullion 14.

Figure 2:
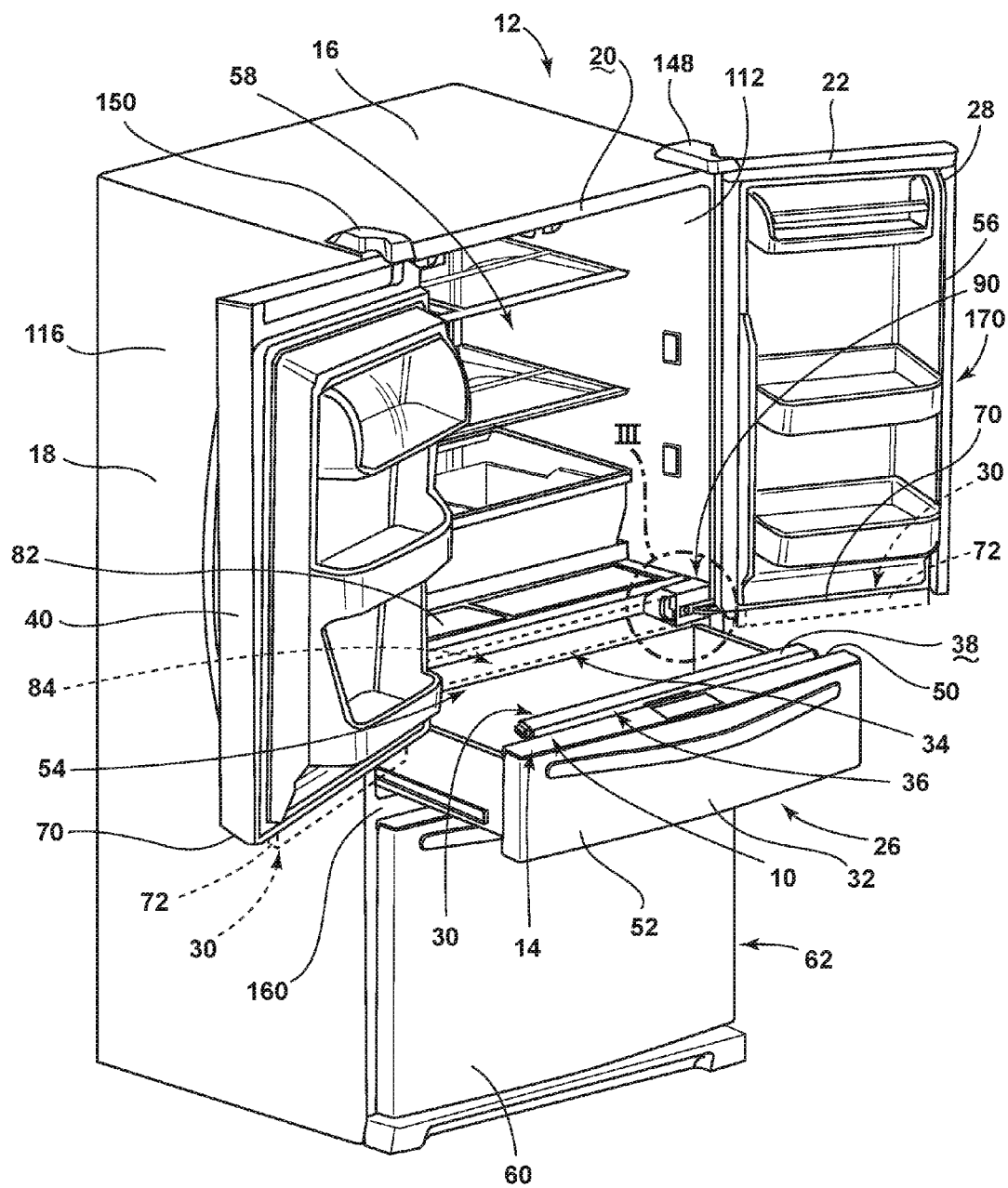
FIG. 2 is a top perspective view of the appliance of FIG. 1 with the pantry drawer and the refrigerator compartment doors in an open position and illustrating the operable lateral mullion in the tucked position.
Figure 3:
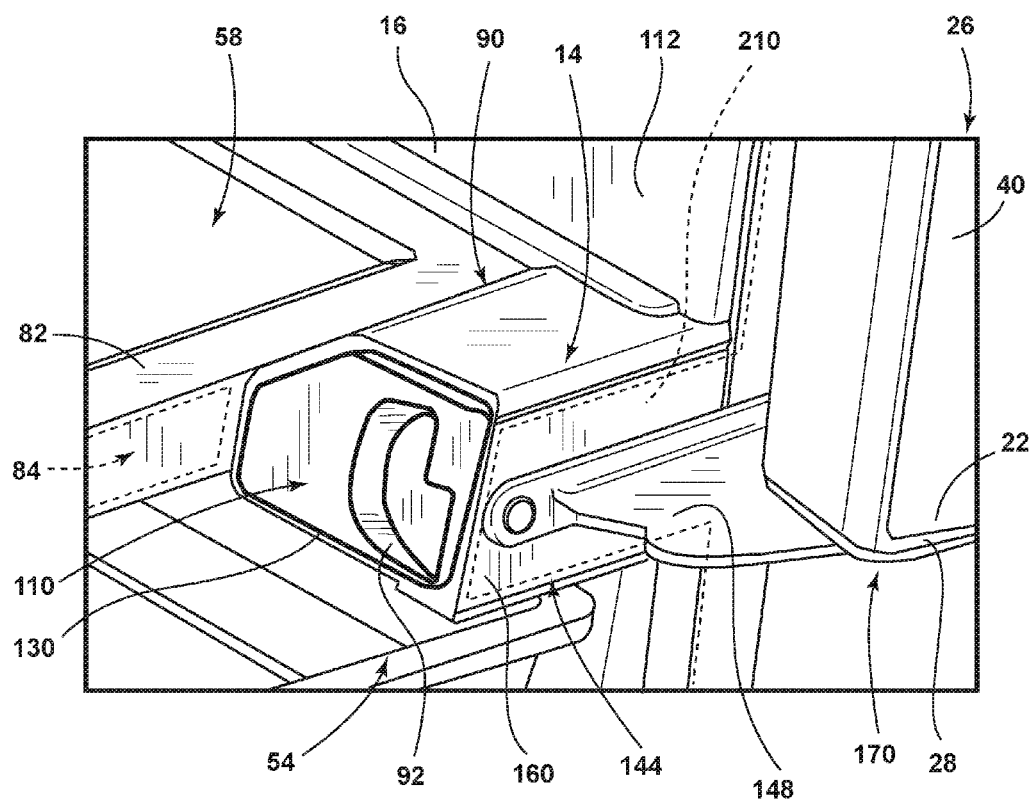
FIG. 3 is an enlarged perspective view of the appliance of FIG. 2 taken at area III.
Figure 4:
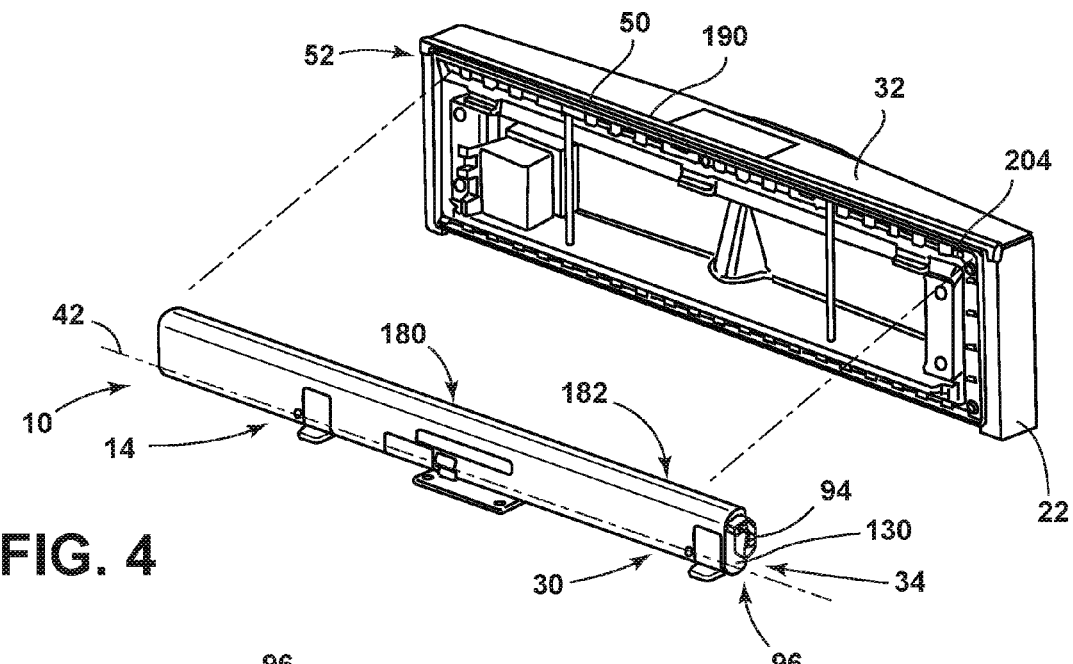
FIG. 4 is a partially exploded rear perspective view of a mullion panel for a refrigerating appliance.
Figure 5:
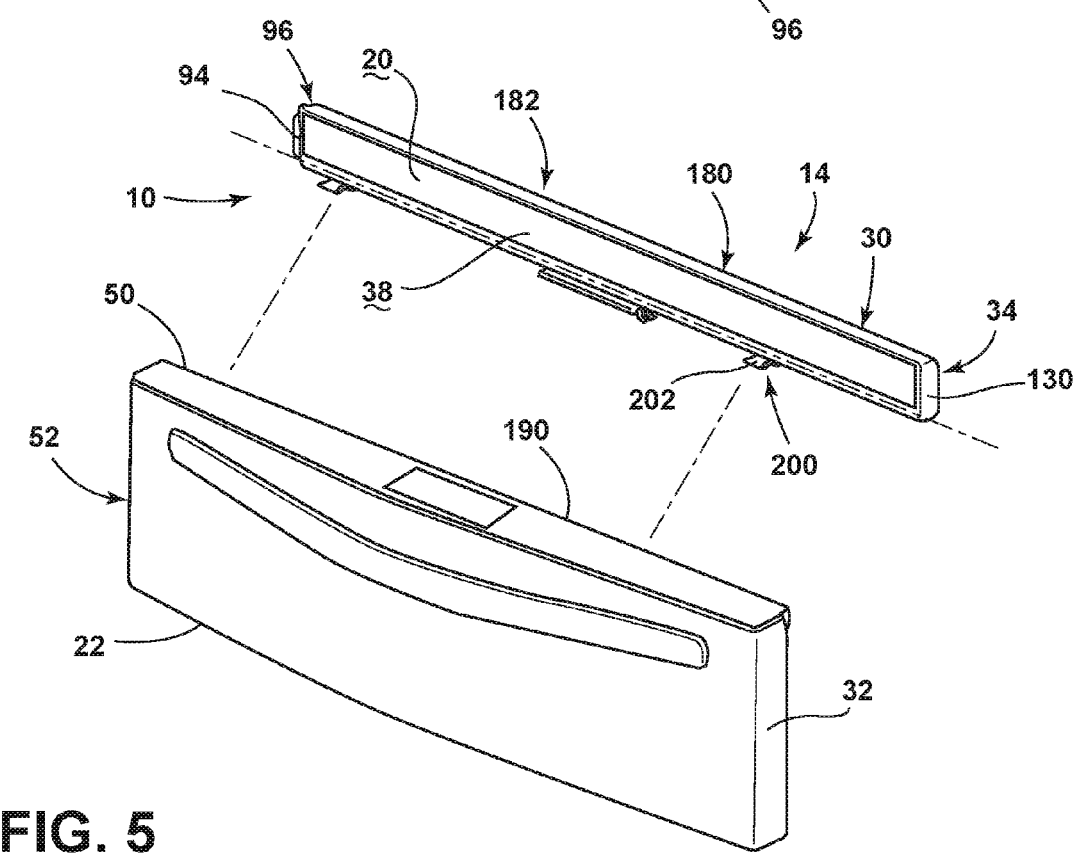
FIG. 5 is a partially exploded front perspective view of the mullion panel of FIG. 4.
Figure 6:
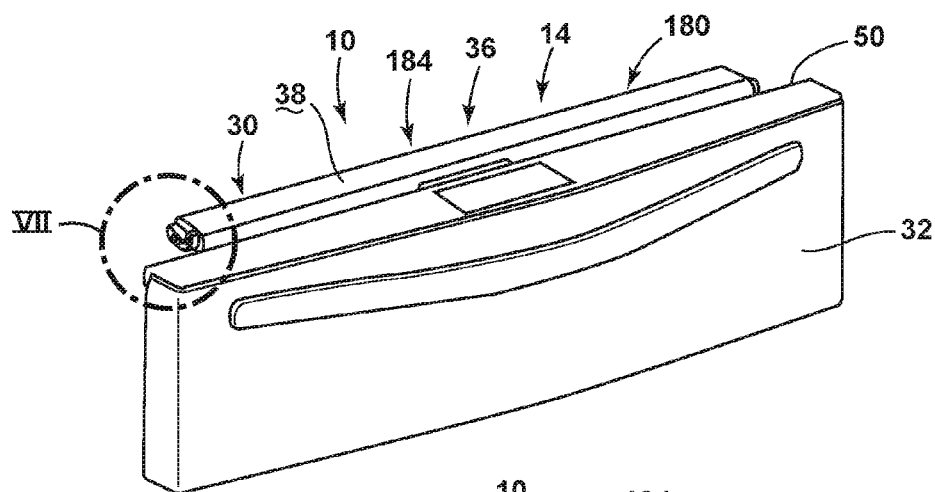
FIG. 6 is a top perspective view of the mullion panel of FIG. 4 illustrating the operable lateral mullion in the tucked position.
Figure 7:
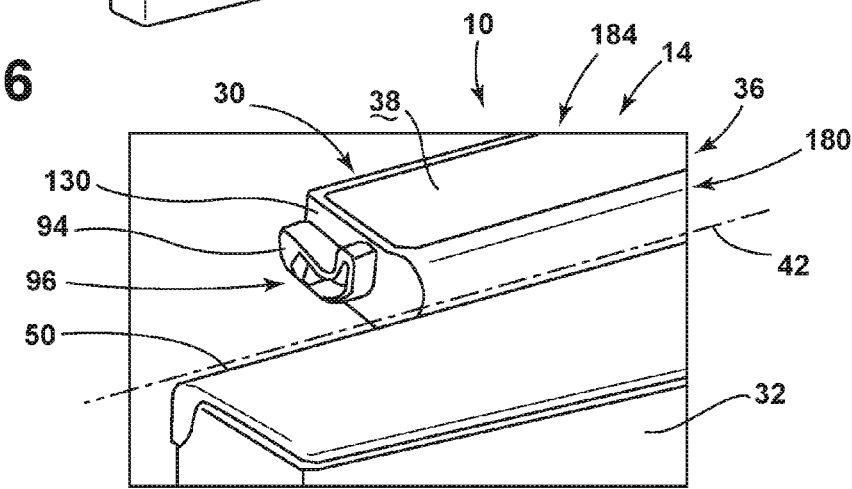
FIG. 7 is an enlarged perspective view of the mullion panel of FIG. 6 taken at area VII.
Figure 8:
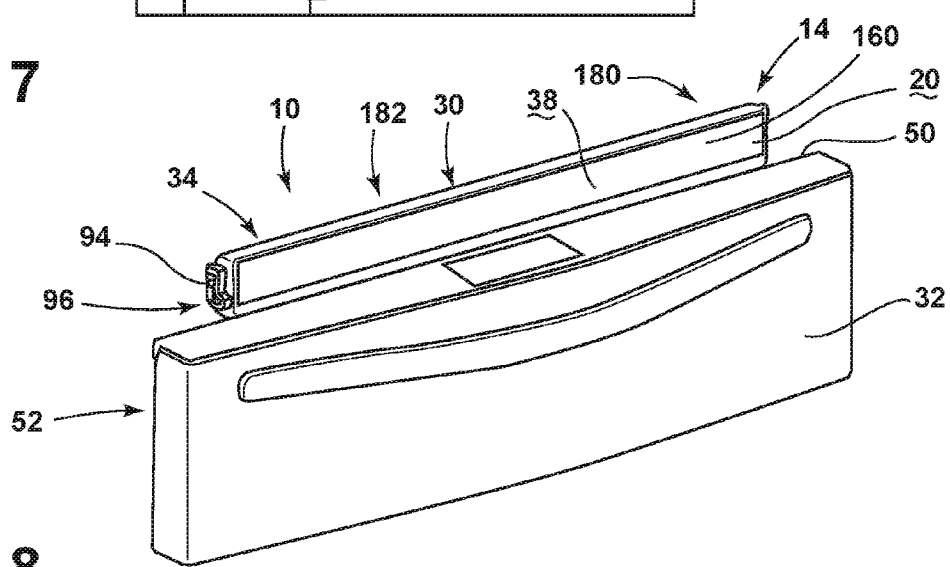
FIG. 8 is a top perspective view of the mullion panel of FIG. 6 with the operable lateral mullion moved to the contact position.
Figure 12:
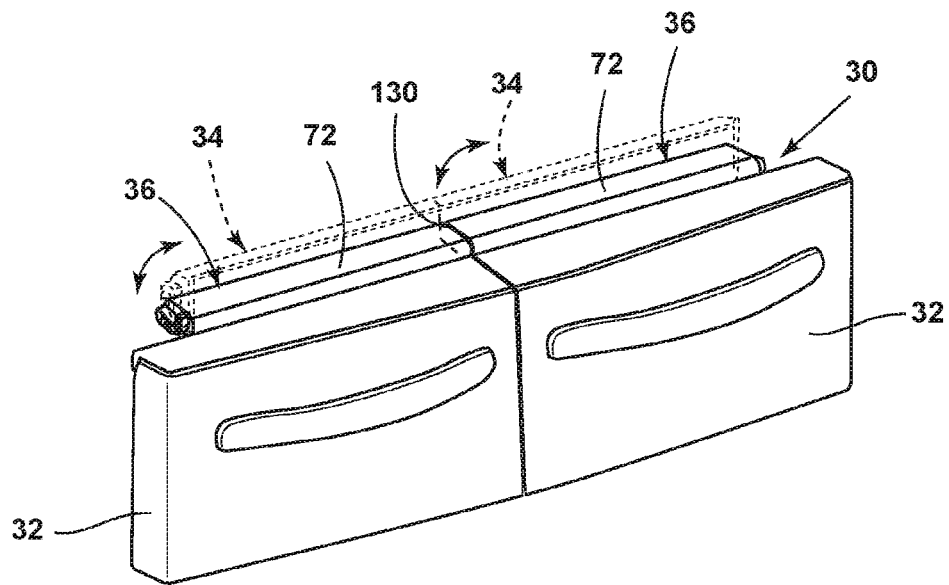
FIG. 12 is a top perspective view of a pair of mullion panels incorporating independently operable sections of an aspect of the lateral mullion, with each of the sections of the lateral mullion in the tucked position.
Figure 13:
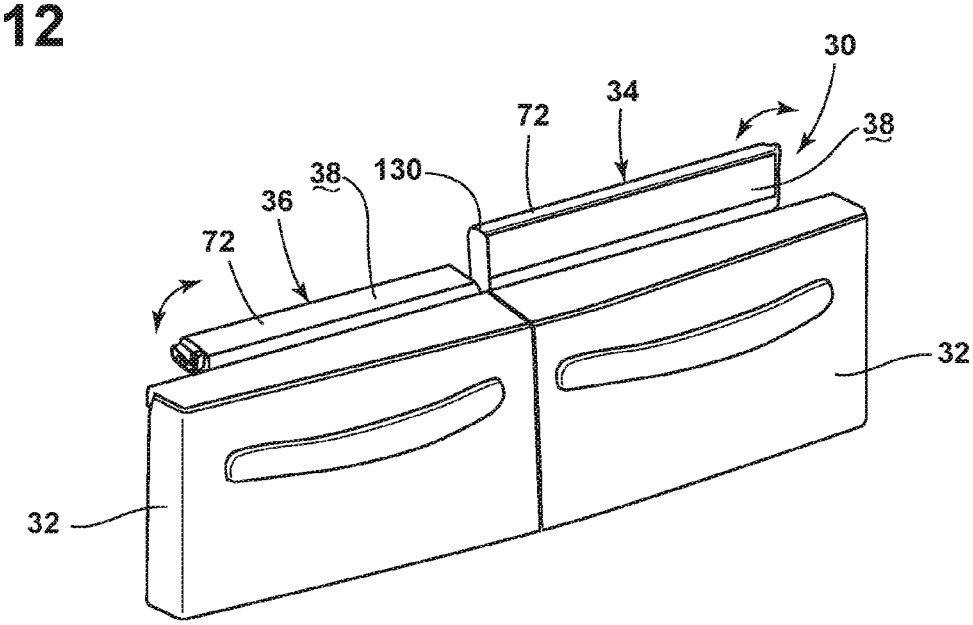
FIG. 13 is a top perspective view of the pair of mullion panels of FIG. 12 with one section of the lateral mullion in the contact position and the other section of the lateral mullion in the tucked position.

Referring now to FIGS. 1-3, the first and second mullion guides 110, 114 can define respective first and second mullion blocks 144, 146 that serve to support a hinge for a vertically adjacent door panel 56. In this manner, the seal 28 of the vertically adjacent door panel 56 serves to engage the portion of the contact surface 20 defined by the lateral mullion 30, when the lateral mullion 30 is in the contact position 34. It is contemplated that where the appliance 12 is a French door bottom mount (FDBM) appliance, each of the first and second mullion guides 110, 114 can define first and second mullion blocks 144, 146 that each support respective first and second hinges 148, 150, where the first and second hinges 148, 150 support respective door panels 56 of the pair of operable French doors for the appliance 12.

Referring again to FIGS. 1-13, the appliance 12 can include a mullion assembly 10 that defines a false mullion 14 for the appliance 12. The mullion assembly 10 can include the lateral mullion 30 that is operable about the horizontal axis 42 between the contact position 34 and tucked position 36. In this manner, the contact position 34 places an outer surface 38 of the lateral mullion 30 in the vertical orientation to define a contact surface 20 of the appliance 12. In this manner, the contact surface 20 of the appliance 12 is substantially placed in a single vertical plane 160. When the lateral mullion 30 is moved to a tucked position 36, the portion of the contact surface 20 defined by the lateral mullion 30 is moved out of this single vertical plane 160. The at least one mullion guide 90, that can be defined by the first and second mullion guides 110, 114, are attached to the cabinet 16 of the appliance 12. The first and second mullion guides 110, 114 are positioned such that each receives an opposing end 96 of the lateral mullion 30 as the lateral mullion 30 moves into and away from the contact position 34. The engagement of the lateral mullion 30 with the first and second mullion guides 110, 114 further defines the contact surface 20 when the lateral mullion 30 is in the contact position 34. Accordingly, at least a portion of the first and second mullion guides 110, 114 also define a portion of the contact surface 20 within the single vertical plane 160.

Referring again to FIGS. 1-13, the mullion panel 32 is operable between open and closed positions 26, 24 relative to the contact surface 20. In this manner, the lateral mullion 30 is pivotally coupled to the mullion panel 32 such that operation of the mullion panel 32 to the closed position 24 defines the engagement between the lateral mullion 30 and the first and second mullion guides 110, 114 to operate the lateral mullion 30 from a tucked position 36 to the contact position 34. Conversely, operation of the mullion panel 32 away from the closed position 24 serves to allow the first and second mullion guides 110, 114 to operate the lateral mullion 30 from the contact position 34 and into the tucked position 36 such that the outer surface 38 of the lateral mullion 30 is no longer flush with the remainder of the contact surface 20 of the appliance 12. The vertically adjacent panel 40 is operable between the panel open position 170 and the panel closed position 172. The vertically adjacent panel 40, when in the panel closed position 172, engages the portion of the contact surface 20 defined by the lateral mullion 30 in the contact position 34. Specifically, the seal 28 of the vertically adjacent panel 40 in the closed position 24 selectively engages the outer surface 38 of the lateral mullion 30 when the lateral mullion 30 is in the contact position 34.

Referring again to FIGS. 2-13, as discussed above, operation of the mullion panel 32 from the closed position 24 to the open position 26 is defined by the engagement of the lateral mullion 30 with the first and second mullion guides 110, 114. This engagement serves to rotate the lateral mullion 30 from the contact position 34 to the tucked position 36 such that the lateral mullion 30 is placed behind the mullion panel 32. When in the tucked position 36, the lateral mullion 30 can bypass the vertically adjacent panel 40 and allow the mullion panel 32 to move to the open position 26 without substantially disturbing the vertically adjacent panel 40 when in the closed position 24. It is contemplated, in various embodiments, that the lateral mullion 30 may engage only one mullion guide 90.

Referring again to FIGS. 1-13, it is contemplated that the cabinet 16 includes the plurality of outer walls 18 that define at least a portion of the contact surface 20. The contact surface 20 of the appliance 12 includes a selectively operable lateral portion 180 that operates between the flush position 182 and the displaced position 184. The lateral mullion 30 selectively defines a selectively operable lateral portion 180 of the contact surface 20. As discussed above, the lateral mullion 30 is selectively operable between a contact position 34 and the tucked position 36. The contact position 34 can correspond to the flush position 182 of the selectively operable lateral portion 180. The flush position 182 is further defined by the selectively operable lateral portion 180 being flush with the remainder of the contact surface 20. The tucked position 36 of the lateral mullion 30 can correspond to the displaced position 184 of the selectively operable lateral portion 180 such that the displaced position 184 further defines the selectively operable lateral portion 180 being free of alignment with the remainder of the contact surface 20 and free of alignment with the single vertical plane 160 that substantially defines the contact surface 20 of the appliance 12.

Referring again to FIGS. 1-13, the mullion panel 32 is operable between the open and closed position 24 such that the lateral mullion 30 is pivotally connected proximate a laterally extending edge 190 of the mullion. The laterally extending edge 190 may be the top edge 50 of the bottom edge 70 of the mullion panel 32, depending on the design of the appliance 12. The open position 26 of the mullion panel 32 corresponds to the displaced position 184 of the selectively operable lateral portion 180 such that the lateral mullion 30 is in a tucked position 36 and allowed to pass by the vertically adjacent panel 40 when in the closed position 24. Conversely, the closed position 24 of the mullion panel 32 corresponds to the flush position 182 of the selectively operable lateral portion 180 as well as the contact position 34 of the lateral mullion 30, such that the contact position 34 of the lateral mullion 30 corresponds to the selectively operable lateral portion 180 being in the flush position 182 and substantially within the single vertical plane 160 that defines the contact surface 20 of the appliance 12.

Referring again to FIGS. 1-13, the vertically adjacent panel 40 is operable between the panel open position 170 and the panel closed position 172. In this manner, the vertically adjacent panel 40, when in the panel closed position 172, engages the selectively operable lateral portion 180 in the flush position 182. As discussed above, the selectively operable lateral portion 180 is operable between the flush position 182 and the displaced position 184 when the vertically adjacent panel 40 is in either the panel open or panel closed positions 170, 172. This is due to the configuration of the lateral mullion 30 and the mullion guides 90 that allow for the rotation of the lateral mullion 30 about the horizontal axis 42 and between the contact position 34 and the tucked position 36 while the lateral mullion 30 is behind the vertically adjacent panel 40. As such, the lateral mullion 30 moves into the tucked position 36 through engagement of the guide flanges 94 of the lateral mullion 30 with the guide grooves 92 of the first and second mullion guides 110, 114 while the lateral mullion 30 is behind the vertically adjacent panel 40. Accordingly, the tucked position 36 of the lateral mullion 30 is achieved. While the lateral mullion 30 is substantially even with or behind the vertically adjacent panel 40. In this manner, the lateral mullion 30 is already in a tucked position 36 as the lateral mullion 30 passes the vertically adjacent panel 40 and is allowed to pass by the vertically adjacent panel 40 without substantially engaging the vertically adjacent panel 40.

Referring now to FIGS. 9-11, it is contemplated that during operation of the lateral mullion 30 between a tucked position 36 and the contact position 34, the selectively operable lateral portion 180 of the lateral mullion 30 only engages the vertically adjacent panel 40 in the closed position 24 when the selectively operable lateral portion 180 is in the flush position 182, or substantially in the flush position 182. Accordingly, movement of the selectively operable lateral portion 180 from the flush position 182 to the displaced position 184 first allows the selectively operable lateral portion 180 to move rearward and away from the seal 28 of the vertically adjacent panel 40. In this manner, the movement of the selectively operable lateral portion 180 away from the flush position 182 first breaks the engagement seal 28 between the selectively operable lateral portion 180 rotates and the seal 28 of the vertically adjacent panel 40. Simultaneously, the selectively operable lateral portion 180 rotates vertically about the horizontal axis 42 and away from the vertically adjacent panel 40 and toward the tucked position 36 behind the mullion panel 32 such that the lateral mullion 30 can pass by the vertically adjacent panel 40, whether above or below the vertically adjacent panel 40, depending upon the configuration of the appliance 12.

Referring now to FIGS. 1-3, the incorporation of the operable lateral mullion 30 from the appliance 12 serves to form the false mullion 14 of the appliance 12 only when necessary to form a seal 28 between the various operable panels 22 of the appliance 12. When the lateral mullion 30 is moved into the tucked position 36 and the mullion panel 32 is moved to the open position 26, the false mullion 14 is substantially eliminated. In this manner, additional storage areas 84 are made accessible and available in the area selectively vacated by the lateral mullion 30 when moved from the contact position 34 to the tucked position 36 and when the mullion panel 32 is moved to the open position 26. The selective removal of the false mullion 14 through the operation of the lateral mullion 30 and the mullion panel 32 serves to provide additional storage areas 84 within the appliance 12 and provides greater accessibility to the various interior compartments 80 of the appliance 12 proximate the removable false mullion 14. Selective removal of the lateral mullion 30 through operation of the mullion panel 32 can also serve to provide areas within which portions of the various utility systems can be accessed. By way of example, and not limitation, a water filter, ice maker, water tank, light fixture, or other similar utility feature of the appliance 12 can be accessed behind the false mullion 14 when the lateral mullion 30 is moved to the tucked position 36 and the mullion panel 32 is moved to the open position 26 to reveal various access points of the appliance 12 behind the selectively removable false mullion 14.

It is also contemplated that various smaller storage areas 84 can be defined behind the selectively removable false mullion 14 where these smaller storage spaces may have different environmental conditions such as different temperatures, humidity levels, or other environmental differences from the adjacent interior compartments 80 of the appliance 12 above and/or below the false mullion 14. Accordingly, a storage area 84 behind the selectively removable false mullion 14 can define an additional refrigerated compartment 58, freezing compartment, warming compartment, crisper, chiller, turbo cooling compartment, combinations thereof, or other similar interior compartment having a dedicated functionality.

According to the various embodiments, it is contemplated that the operation of the lateral mullion 30 can be controlled by various biasing mechanisms 200 that serve to bias the lateral mullion 30 toward the tucked position 36. In this manner, operation of the lateral mullion 30 from the tucked position 36 to the contact position 34 can only be achieved, or substantially only be achieved, through use of the first and second mullion guides 110, 114 to overcome the biasing force of the biasing mechanism 200 and operate the lateral mullion 30 to the contact position 34. The use of the biasing mechanism 200 serves to maintain the lateral mullion 30 in the tucked position 36 when the mullion panel 32 is in the open position 26. Accordingly, the lateral mullion 30 can be properly aligned to properly engage the first and/or second mullion guides 110, 114 when the mullion panel 32 is moved into the closed position 24 and the lateral mullion 30 can be operated by the mullion guides 90 into the contact position 34. It is contemplated that the biasing mechanism 200 can be incorporated into the clips 202 that extend from a portion of the lateral mullion 30 to engage with the mullion panel 32 at a clip receptacle 204.

Referring again to FIGS. 2 and 3, where the first and/or second mullion guides 110, 114 define the first and second mullion blocks 144, 146 that support the first and second hinges 148, 150, the first and second mullion guides 110, 114 can include structural members 210 that are incorporated within a cabinet 16 to provide a robust support for the first and second hinges 148, 150 and, in turn, the first and second operable door panels 56. The structural members 210 disposed within the first and second mullion guides 110, 114 serve to support the first and second mullion guides 110, 114 without substantially interfering with the operation of the lateral mullion 30 between the tucked and contact position 36, 34. In this manner, the mullion guide 90 is sized to accommodate the structural attachment points of each hinge of the operable door panels 56 such that a minimal width of the first and second mullion guides 110, 114 can be achieved while maximizing the width of the lateral mullion 30 within the false mullion 14. This greater width of the lateral mullion 30 and lesser width of the mullion guides 90 serves to maximize the accessibility behind the false mullion 14 through which various additional storage areas 84 can be available to the user when the selectively removable false mullion 14 is removed through operation of the mullion panel 32 to the open position 26 and the lateral mullion 30 to the tucked position 36.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An appliance comprising:
    a cabinet having a plurality of outer walls that define a portion of a contact surface;
    a plurality of operable panels operably engaged with the cabinet, wherein each operable panel is operable between closed and open positions, wherein the closed position of each respective operable panel is defined by a seal of the respective operable panel being in direct contact with the contact surface; and
    a lateral mullion that is pivotally attached to a mullion panel of the plurality of operable panels and is pivotally operable between a contact position and a tucked position, wherein the contact position is defined when the mullion panel is in the closed position such that an outer surface of the lateral mullion is in a vertical orientation and defines a portion of the contact surface to receive the seal of the mullion panel and selectively receive seals of two vertically adjacent panels, and wherein movement of the mullion panel to the open position rotates the lateral mullion about a horizontal axis to define the tucked position such that the mullion panel can move to the open position free of operation of the two vertically adjacent panels, at least one mullion guide that includes first and second mullion guides, wherein the first and second mullion guides define first and second mullion blocks that each support a hinge for one of the two vertically adjacent panels, respectively.

2. The appliance of claim 1, wherein the lateral mullion is positioned proximate a top edge of the mullion panel.

3. The appliance of claim 1, wherein the mullion panel is defined by a drawer panel of a slidable drawer, and wherein the two vertically adjacent panels are first and second rotationally operable door panels that rotate about respective vertical axes.

4. The appliance of claim 1, further comprising:
    the at least one mullion guide that further defines the contact surface, wherein the at least one mullion guide is positioned to engage the lateral mullion in the contact position, wherein the lateral mullion and the at least one mullion guide cooperate to define a false mullion extending between side walls of the cabinet.

5. The appliance of claim 4, wherein the at least one mullion guide includes a guide groove that engages a guide flange at an end of the lateral mullion, and wherein movement of the mullion panel proximate the closed position engages the guide flange of the lateral mullion with the guide groove of the at least one mullion guide to operate the lateral mullion between the contact and tucked positions.

6. The appliance of claim 4, wherein the first and second mullion guides slidably engage respective ends of the lateral mullion.

7. The appliance of claim 6, wherein the first and second mullion guides define first and second mullion blocks that each support a hinge for one of the two vertically adjacent panels, respectively, and wherein the seals of the two vertically adjacent panels selectively engage the portion of the contact surface defined by the lateral mullion when the lateral mullion is in the contact position.

8. The appliance of claim 7, wherein each of the hinges are defined within the first and second mullion blocks, respectively, and wherein a space between the first and second mullion blocks receives the lateral mullion in the contact position.

9. The appliance of claim 8, wherein each of the first and second mullion blocks are separated by the space and are free of structural support from the other of the first and second mullion blocks.

10. The appliance of claim 9, wherein the first and second mullion blocks include structural members that extend from opposing sidewalls, respectively, of the plurality of outer walls and into each of the first and second mullion blocks.

11. The appliance of claim 9, wherein the lateral mullion in the contact position and the first and second mullion blocks define a substantially continuous portion of the contact surface extending between opposing sidewalls.

12. A mullion assembly of an appliance, the mullion assembly comprising:
    a lateral mullion operable about a horizontal axis between a contact position and a tucked position, wherein the contact position places an outer surface of the lateral mullion in a vertical orientation to define a portion of a contact surface of the appliance, and wherein the contact surface is substantially positioned in a single vertical plane;
    first and second mullion guides attached to a cabinet of the appliance that are positioned such that each of the first and second mullion guides receives a respective end of the lateral mullion in the contact position to define the contact surface;
    a mullion panel that is operable between open and closed positions relative to the contact surface, wherein the lateral mullion is pivotally coupled to the mullion panel such that operation of the mullion panel to the closed position defines an engagement between the lateral mullion and the first and second mullion guides to operate the lateral mullion from the tucked position to the contact position, and wherein operation of the mullion panel away from the closed position causes the first and second mullion guides to operate the lateral mullion from the contact position to the tucked position; and
    vertically adjacent first and second operable door panels that are each operable between a panel open position and a panel closed position, wherein when at least one of the first and second operable door panels is in the panel closed position, the at least one of the first and second operable door panels engages the portion of the contact surface defined by the lateral mullion in the contact position, wherein the first and second mullion guides define first and second mullion blocks, respectively, and wherein the first and second mullion blocks support first and second hinges, respectively.

13. The mullion assembly of claim 12, wherein the tucked position of the lateral mullion provides for operation of the mullion panel from the closed position to the open position when either of the first and second operable door panels are in either of the panel open and panel closed positions.

14. The mullion assembly of claim 12, wherein the lateral mullion is positioned proximate a top edge of the mullion panel.

15. The mullion assembly of claim 12, wherein the mullion panel is defined by a drawer panel of a slidable drawer, and wherein the first and second operable door panels are each a pair of hinged door panels that rotates about respective vertical axes.

16. The mullion assembly of claim 15, wherein the slidable drawer is a pantry drawer.

17. The mullion assembly of claim 12, wherein each of the first and second mullion guides include a guide flange that engages a guide groove at a respective end of the lateral mullion, and wherein movement of the mullion panel proximate the closed position engages the guide grooves of the lateral mullion with the respective guide flanges of the first and second mullion guides to operate the lateral mullion between the contact and tucked positions.

18. The mullion assembly of claim 12, wherein the first and second hinges support the first and second operable door panels, respectively, wherein the first and second mullion blocks are separated from one another to define a space that receives the lateral mullion, wherein the first and second mullion blocks define a portion of the contact surface and are free of structural support from the other of the first and second mullion blocks.

19. An appliance comprising:
a cabinet having a plurality of walls that define a portion of a contact surface, wherein the contact surface includes a selectively operable lateral portion that operates between a flush position and a displaced position;
a lateral mullion that selectively defines the selectively operable lateral portion of the contact surface, wherein the lateral mullion is selectively operable between a contact position that corresponds to the flush position, wherein the selectively operable lateral portion is flush with a remainder of the contact surface, and a tucked position that corresponds to the displaced position wherein the selectively operable lateral portion is free of alignment with the remainder of the contact surface, wherein the contact surface includes first and second mullion blocks positioned at opposing sides of the lateral mullion and attached to opposing sidewalk of the plurality of walls, and wherein each of the first and second mullion blocks includes a structural member that is parallel with the lateral mullion and that supports respective hinges within the contact surface, and wherein the first and second mullion blocks define a space therebetween such that each of the first and second mullion blocks are free of structural support from the other of the first and second mullion blocks;
a mullion panel that is operable between open and closed positions and wherein the lateral mullion is pivotally connected proximate a laterally extending edge of the mullion panel, wherein the open position of the mullion panel corresponds to the displaced position of the selectively operable lateral portion and the closed position of the mullion panel corresponds to the flush position of the selectively operable lateral portion within the space between the first and second mullion blocks; and
a pair of vertically adjacent hinged door panels that are each mounted on the respective hinges and are operable between respective panel open and panel closed positions, wherein each door panel of the pair of vertically adjacent hinged door panels in the panel closed position engages the selectively operable lateral portion in the flush position, and wherein the selectively operable lateral portion is operable between the flush and displaced positions when the pair of vertically adjacent hinged door panels is in any of the panel open and panel closed positions.

20. The appliance of claim 19, further comprising:
first and second mullion guides that define a portion of the contact surface, and wherein the first and second mullion guides are defined within the first and second mullion blocks, respectively, and engage the lateral mullion to operate the selectively operable lateral portion between the flush position and the displaced position.

* * * * *